United States Patent
Anumalasetty et al.

(10) Patent No.: US 9,268,496 B2
(45) Date of Patent: Feb. 23, 2016

(54) CHOOSING A MULTIPATH I/O (MPIO) PATH CONTROL MODULE (PCM) FOR A LOGICAL UNIT NUMBER (LUN) ON A HOST THAT SUPPORTS MULTIPLE PCMS

(71) Applicant: International Business Machines Corporation, Armonk, NY (US)

(72) Inventors: Kiran K. Anumalasetty, Bangalore (IN); Venkata N. Anumula, Hyderabad (IN); Vinod K. Boddukuri, Hyderabad (IN); Sudhir Maddali, Hyderabad (IN); Yadagiri Rajaboina, Hyderabad (IN); Sanket Rathi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 14/328,793

(22) Filed: Jul. 11, 2014

(65) Prior Publication Data
US 2016/0011814 A1    Jan. 14, 2016

(51) Int. Cl.
G06F 3/00 (2006.01)
G06F 13/12 (2006.01)
G06F 3/06 (2006.01)

(52) U.S. Cl.
CPC ............ G06F 3/0635 (2013.01); G06F 3/0604 (2013.01); G06F 3/067 (2013.01)

(58) Field of Classification Search
None
See application file for complete search history.

(56) References Cited

U.S. PATENT DOCUMENTS

| | | | |
|---|---|---|---|
| 6,538,669 B1 | 3/2003 | Lagueux, Jr. et al. | |
| 6,745,207 B2 | 6/2004 | Reuter et al. | |
| 7,055,014 B1 | 5/2006 | Pawlowski et al. | |
| 7,127,545 B1* | 10/2006 | Nandi | G06F 3/0613 709/224 |
| 7,275,103 B1 | 9/2007 | Thrasher et al. | |
| 7,831,761 B2* | 11/2010 | Phelan | G06F 9/45558 710/38 |
| 2005/0097243 A1* | 5/2005 | Yamashita | G06F 3/0605 710/38 |
| 2005/0203910 A1 | 9/2005 | Taguchi et al. | |
| 2006/0143332 A1 | 6/2006 | Yagi et al. | |
| 2007/0174849 A1* | 7/2007 | Cheung | G06F 9/4411 719/321 |
| 2010/0250886 A1 | 9/2010 | Eguchi et al. | |

OTHER PUBLICATIONS

Anonymous, "MultiPath I/O Task Help," MPIO Task Help, Accessed on: Mar. 21, 2014, http://blake.ism.u-bordeaux1.fr/doc_link/C/a_doc_lib/wsmehelp/wsmedevs/mpio_text.htm.

Watanabe et al., "Oracle Database 10g Automatic Storage Management Best Practices with Hitachi Replication Software on the Hitachi Universal Storage Platform™ Family of Products," An application brief from Hitachi Data Systems and Oracle, Jun. 2007, p. 1-37, Hitachi Data Systems.

\* cited by examiner

Primary Examiner — David E Martinez
(74) Attorney, Agent, or Firm — Patricia B. Feighan

(57) ABSTRACT

A method for selecting a path control module (PCM) for a logical unit number (LUN) associated with a host enabled to support multiple PCMs is provided. The method may include selecting a PCM associated with the LUN from a plurality of supported PCMs. The method may also include creating an entry in a configuration database or a configuration file associated with the host, whereby the entry maps the selected PCM with a unique ID associated with the LUN. The method may further include determining a unique ID associated with a hard disk. The method may include matching the unique ID with the created entry. The method may include selecting the PCM from the matched entry based on the matching. Additionally, the method may include loading a kernel extension corresponding to the selected PCM. The method may include configuring the LUN using the loaded kernel extension corresponding to the selected PCM.

17 Claims, 4 Drawing Sheets

CHOOSING A MULTIPATH I/O (MPIO) PATH CONTROL MODULE (PCM) FOR A LOGICAL UNIT NUMBER (LUN) ON A HOST THAT SUPPORTS MULTIPLE PCMS

FIELD OF THE INVENTION

The present invention relates generally to the field of computing, and more particularly to storage area networks.

BACKGROUND

When there are multiple input/output (I/O) paths to a disk in a storage area network, the hosts manage the multiple paths using a path management software. The path management software may be referred to as a path control module (PCM). An operating system may have a default PCM which may be used to manage the multiple paths to storage devices. However, alternatively, a storage vendor may also provide a PCM that may also work for that particular storage server model.

SUMMARY

According to one embodiment, a method for selecting a path control module (PCM) for a logical unit number (LUN) associated with a host enabled to support multiple PCMs is provided. The method may include selecting a PCM associated with the LUN from a plurality of supported PCMs. The method may also include creating an entry in a configuration database or a configuration file associated with the host, whereby the entry maps the selected PCM with a unique ID associated with the LUN. The method may further include determining a unique ID associated with a hard disk. The method may also include matching the unique ID associated with the hard disk with the created entry in the configuration database or the configuration file. The method may include selecting the PCM from the matched entry in the configuration database or the configuration file based on the matching. The method may also include loading a kernel extension corresponding to the selected PCM. Additionally, the method may include configuring the LUN using the loaded kernel extension corresponding to the selected PCM.

According to another embodiment, a computer system for selecting a path control module (PCM) for a logical unit number (LUN) associated with a host enabled to support multiple PCMs is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include selecting a PCM associated with the LUN from a plurality of supported PCMs. The method may also include creating an entry in a configuration database or a configuration file associated with the host, whereby the entry maps the selected PCM with a unique ID associated with the LUN. The method may further include determining a unique ID associated with a hard disk. The method may also include matching the unique ID associated with the hard disk with the created entry in the configuration database or the configuration file. The method may include selecting the PCM from the matched entry in the configuration database or the configuration file based on the matching. The method may also include loading a kernel extension corresponding to the selected PCM. Additionally, the method may include configuring the LUN using the loaded kernel extension corresponding to the selected PCM.

According to yet another embodiment, a computer program product for selecting a path control module (PCM) for a logical unit number (LUN) associated with a host enabled to support multiple PCMs is provided. The computer program product may include one or more computer-readable tangible storage medium and program instructions stored on at least one of the one or more tangible storage medium, the program instructions executable by a processor. The computer program product may include program instructions to select a PCM associated with the LUN from a plurality of supported PCMs. The computer program product may also include program instructions to create an entry in a configuration database or a configuration file associated with the host, whereby the entry maps the selected PCM with a unique ID associated with the LUN. The computer program product may further include program instructions to determine a unique ID associated with a hard disk. The computer program product may also include program instructions to match the unique ID associated with the hard disk with the created entry in the configuration database or the configuration file. The computer program product may include program instructions to select the PCM from the matched entry in the configuration database or the configuration file based on the matching. The computer program product may also include program instructions to load a kernel extension corresponding to the selected PCM. Additionally, the computer program product may include program instructions to configure the LUN using the loaded kernel extension corresponding to the selected PCM.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
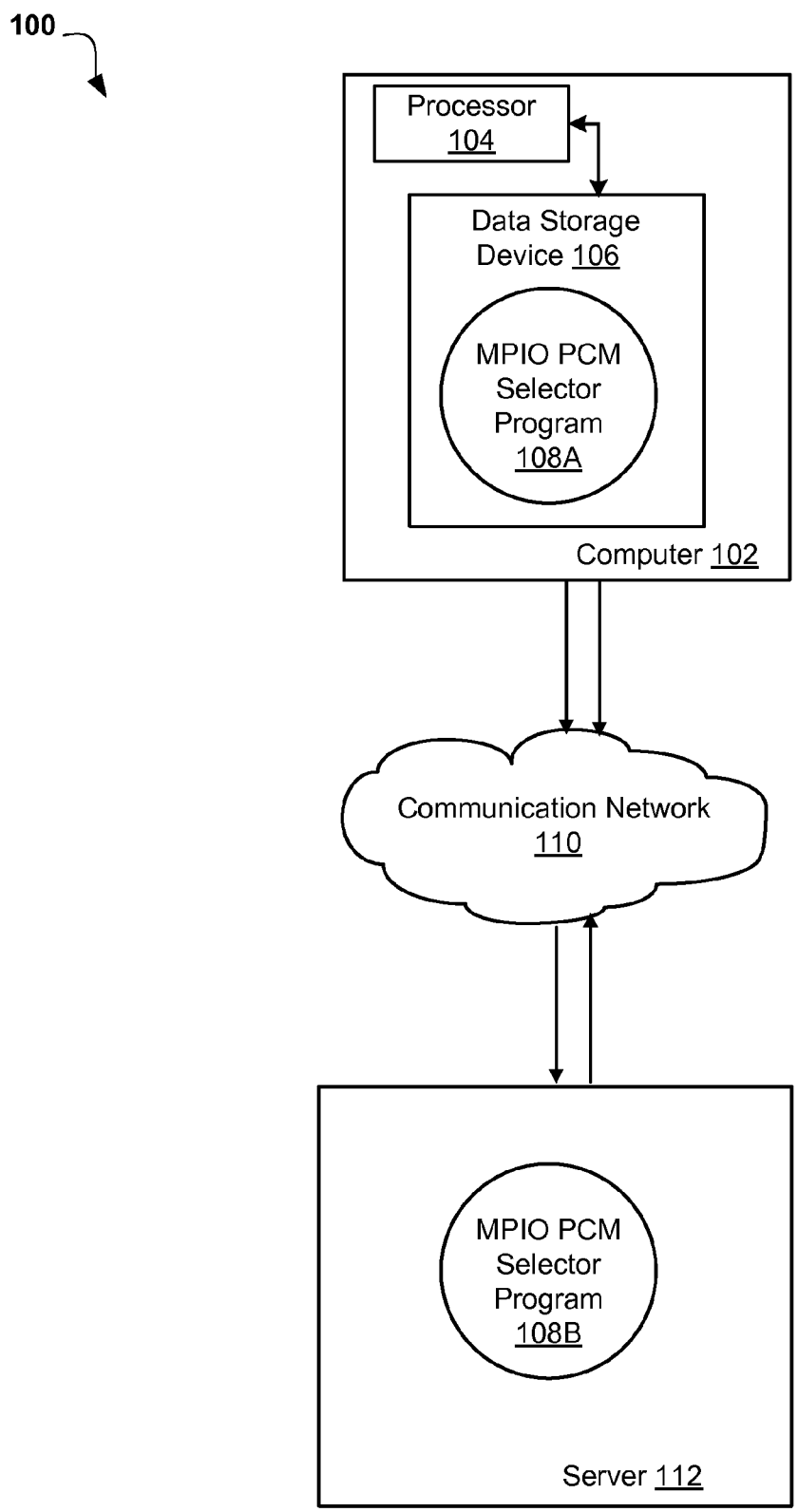
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to storage area networks. The following described exemplary embodiments provide a system, method and program product to, among other things, allow users to choose a path control module (PCM) that is best suited for the applications running on the given hard disk.

As previously described, when there are multiple input/output (I/O) paths to a disk in a storage area network, the hosts manage the multiple paths using a path management software. An operating system may have a default PCM which may be used to manage the multiple paths to storage devices. Alternatively, a storage vendor may also provide a PCM that may work for that particular storage server model. For example, IBM DS8000 storage comes with a SDD (Subsystem Device Driver) PCM which may be installed on a host operating system. As such, the SDD PCM may manage the multiple I/O paths for all the DS8000 disks accessed through the host. However, in the case where there are two DS8000 storage subsystems and one is located at primary site "A" and the other is located at secondary site "B", there may be a replication path setup between the two storage subsystems and peer-to-peer remote copy (PPRC) pairs may be setup with a primary copy on one DS8000 and a secondary copy on the other DS8000. Then, for example purposes, a host, such as host "H" may be accessing the logical unit numbers (LUNs) on both DS8000 subsystems. An LUN may be a number used to identify a logical unit, which may be a device that is addressed by the SCSI (Small Computer System Interface) protocol or protocols that encapsulate SCSI, such as Fiber Channel (FC). As such, it may be possible that some of the LUNs that host "H" is accessing are part of a PPRC relationship and the remaining LUNs may not be part of any PPRC relationship. In such cases, users may want to use a default PCM, such as IBM's Advanced Interactive eXecutive (AIX) PCM, on the LUNs that are part of PPRC relationship (since the AIX default PCM currently supports in band management of PPRC LUNs). Additionally, for the remaining LUNs that are not part of any PPRC relationship, the user may want to use SDDPCM (SDDPCM is the vendor specific PCM for DS8000 devices). However, there is currently no method to select a PCM for a hard disk, from a list of installed PCMs on the host. Additionally, in the current environment, a given storage model may be managed by a given PCM type and all the LUNs belonging to that storage model type may be configured using the same PCM. As such, this may pose a limitation in environments where SCSI inband management of replication devices is enabled and host applications start managing the PPRC LUNs through SCSI inband commands. In such environments, all the LUNs may have to use a PCM that supports PPRC (such as AIX default PCM). Therefore, this will force the non-PPRC LUNs also to use the AIX default PCM. However, if a user was initially using SDDPCM for DS8000 LUNs, then the user may be forced to migrate all the LUNs that include non-PPRC LUNs to use the AIX default PCM. Typically, vendor defined PCMs may work best with the vendor storage since the vendor defined PCMs may exploit the features of the storage subsystem. As such, many customers may prefer using vendor provided PCMs to manage respective storage subsystems.

Furthermore with respect to enterprise systems (when multiple PCMs are running on the host) it may become essential for the host operating system (OS) to provide flexibility to the user to decide which set of LUNs should be managed by what PCM. For example, in the case where a user may select a PCM on a per-hard disk basis. Such flexibility may provide benefits to customers. For example, users may run certain applications requiring LUN replication, using AIX default PCM that supports replication disks. Additionally, users may run certain applications that require load balancing across paths using SDD PCM that supports a load balancing algorithm which may offer greater agility and flexibility for applications deployed in a cloud or virtual environments where it may become increasingly essential for applications to decide what kind of PCM to use based on the features supported by the PCM. As such, it may be advantageous among other things to allow users to choose a path control module (PCM) that is best suited for the applications running on the given hard disk as opposed to forcing users to use the same PCM for all hard disks belonging to a storage model or storage type.

According to at least one embodiment, users may be able to choose a PCM that is best suited for the applications running on the given hard disk as opposed to forcing the users to use the same PCM for all hard disks belonging to a storage model or storage type. As such, there may be more flexibility to the applications to exploit the underlying storage hardware features by way of selecting an appropriate PCM that suits the application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to allow users to choose a path control module (PCM) that is best suited for the applications running on the given hard disk. According to at least one implementation, each individual LUN may be allowed to use a PCM that best suits the LUN. As such, the present embodiment may allow either the user to select a PCM for each LUN to manage multiple paths for that LUN or the user to enable automatically selecting the PCM for each LUN based on the supported features of the LUN.

For example, a host "A" may access a single storage subsystem or multiple storage subsystems. Multiple LUNs from each storage subsystem may be exported as hard disks to the host through a storage area network (SAN). Host "A" may discover all the LUNs visible in the SAN and may detect or configure them using the default PCM for the device type corresponding to the discovered LUN. The default PCM corresponding to a device type is mentioned in the device configuration file or database. As such, according to at least one implementation, the present embodiment may enable a user to select a PCM from a list of available PCMs that are supported for the device type. Therefore, the user may select the PCM and then reconfigure the LUN such that the LUN is configured to use the new PCM selected by the user.

According to one implementation, for a given disk on the host, a user may select the PCM from a list of supported PCMs. Then an entry in the host configuration database or host configuration file may be created that may map the selected PCM in the previous step with the Unique Identifier of the LUN. Next, the user may un-configure and re-configure the disk device corresponding to the LUN. During the device configuration, the host may discover the LUN. As such, the device ID and vendor ID may be determined from the standard SCSI Inquiry data. The combination of the device ID and the vendor ID may be used to determine the type of the hard disk device instance. Then, a unique identifier that is based on device serial number may be determined. The device serial number may be obtained from the corresponding extended vital product data (VPD) Inquiry page of the LUN. The unique identifier of the LUN may then be compared with the entries created in configuration database (as previously described). If there is a match, then the PCM from the matched entry may be used to configure the LUN. However, if there is not a match, then the default PCM value from the configuration database for the disk device type previously determined may be used. Then, the PCM kernel extension previously selected may be loaded and the kernel extension ID may be passed to the device driver configuration entry point while configuring the LUN. As such, the LUN may be configured using the selected PCM module.

Referring now to FIG. 1, an exemplary networked computer environment 100 in accordance with one embodiment is depicted. The networked computer environment 100 may include a computer 102 with a processor 104 and a data storage device 106 that is enabled to run an MPIO (Multi-Path I/O) PCM Selector Program 108A. The networked computer environment 100 may also include a server 112 that is enabled to run an MPIO (Multi-Path I/O) PCM Selector Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as an MPIO PCM Selector Program 108A and 108B may run on the client computer 102 or on the server computer 112. The MPIO PCM Selector Program 108A, 108B may select a multipath I/O (MPIO) path control module (PCM) for a logical unit number (LUN) on a host that supports multiple PCMs. The MPIO PCM Selector method is explained in further detail below with respect to FIG. 3.

Figure 2:
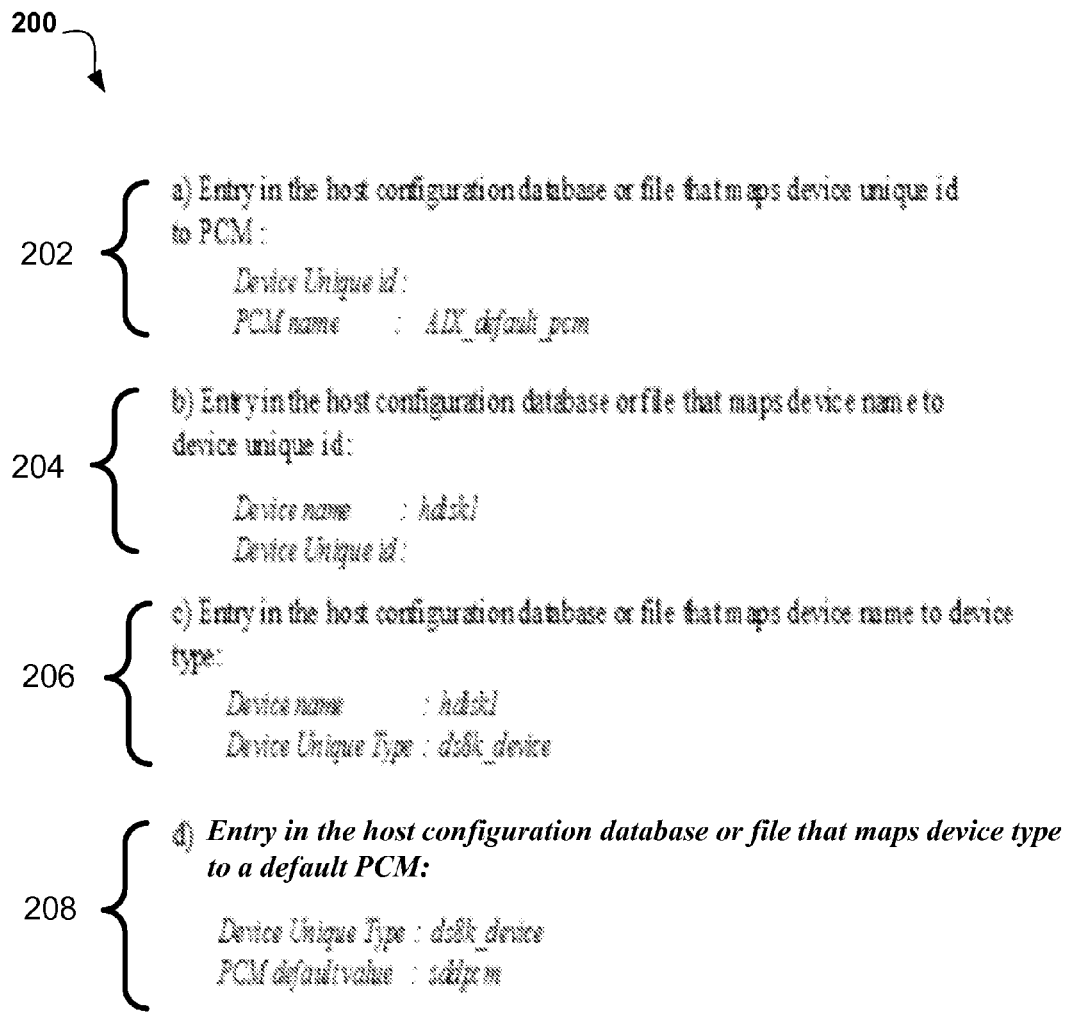
FIG. 2 is an exemplary host configuration database entry or host configuration file entry according to at least one embodiment.

Referring now to FIG. 2, an exemplary illustration 200 of host configuration database entries or host configuration file entries in accordance with one embodiment is depicted. As such, FIG. 2 illustrates the host configuration database entries or host configuration file entries that the MPIO PCM Selector Program 108A, 108B may use or create to in order to select a multipath I/O (MPIO) path control module (PCM) for a logical unit number (LUN) on a host that supports multiple PCMs. As such, 202 is indicative of an example of an entry in the host configuration database or host configuration file that maps a device unique ID to a PCM. Also at 204, an example of an entry in the host configuration database or host configuration file that maps a device name to a device unique ID is depicted. Furthermore at 206, an example of an entry in the host configuration database or host configuration file that maps a device name to a device type is shown. Similarly at 208, an example of an entry in the host configuration database or host configuration file that maps a device type to a default PCM is depicted.

Figure 3:
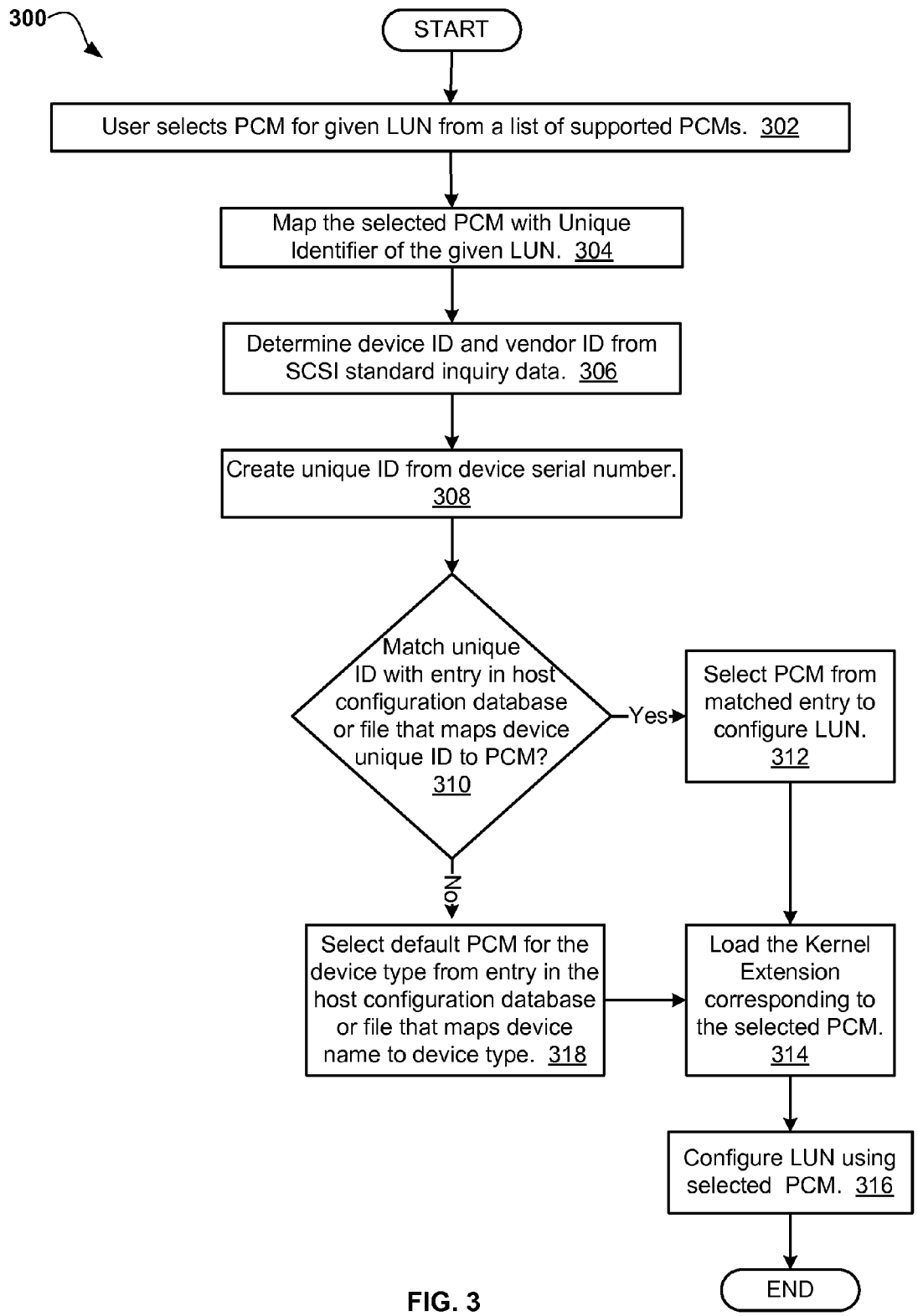
FIG. 3 is an operational flowchart illustrating the steps carried out by a program to select a multipath I/O (MPIO) path control module (PCM) for a logical unit number (LUN) on a host that supports multiple PCMs according to at least one embodiment.

Referring now to FIG. 3, an operational flowchart 300 illustrating the steps carried out by a program to select a multipath I/O (MPIO) path control module (PCM) for a logical unit number (LUN) on a host that supports multiple PCMs in accordance with one embodiment is depicted. According to the present embodiment, the MPIO PCM Selector Program 108A, 108B (FIG. 1) may select a multipath I/O (MPIO) path control module (PCM) for a logical unit number (LUN) on a host that supports multiple PCMs. As such, the MPIO PCM Selector Program 108A, 108B (FIG. 1) may allow users to be able to choose a PCM that is best suited for the applications running on the given hard disk as opposed to forcing the users to use the same PCM for all hard disks belonging to a storage model or storage type.

Referring now to FIG. 3 at 302, a user may select a path control module (PCM) for a given logical unit number (LUN) from a list of supported PCMs. As such, a user may be enabled to select a PCM from a list of available PCMs that are supported for the device type. According to one implementation, the user may select the PCM and then reconfigure the LUN such that the LUN is configured to use the new PCM selected by the user.

Then at 304, the selected PCM is mapped with the unique identifier of the given LUN. As such, an entry in the host configuration database or configuration file may be created that maps the selected PCM from previous step 302 with the unique identifier of the LUN. An example of such an entry in the host configuration database or host configuration file that maps a unique ID to a PCM is depicted as entry "a" in 202 (FIG. 2). According to one implementation, a user may be able to un-configure or re-configure the disk device corresponding to the LUN.

Next, at 306, the device ID and vendor ID are determined from the small computer system interface (SCSI) standard inquiry data. As such, the combination of the device ID and the vendor ID is used to determine the type of the hard disk device instance.

Then at 308, a unique ID is created from the device serial number. As such, a unique identifier that is based on a device serial number is determined. For example, a device serial number may be obtained from the corresponding extended vital product data (VPD) inquiry page of the LUN.

Next at 310, the unique ID is matched with the entry in the host configuration database or host configuration file that maps the device unique ID to the PCM. As such, the unique identifier (ID) of the LUN is compared with the entries created in the configuration database as previously described with respect to step 304. For example, a unique ID may be matched with an entry, such as the entry depicted as entry "a" at 202 (FIG. 2).

If at 310, it is determined that the unique ID is matched with the entry in the host configuration database or file that maps the device unique ID to the PCM then at 312, the PCM is selected from the matched entry and the selected PCM is used to configure the LUN.

However, if at 310, it is determined that the unique ID is not matched with the entry in the host configuration database or file that maps the device unique ID to the PCM then at 318, the default PCM may be selected for the device type from the entry in the host configuration database or file that maps the device name to the device type (as depicted at entry "d" 208 (FIG. 2). As such, if there is no match, then the default PCM value from the configuration database for the disk device type (previously determined with respect to step 308) may be used.

Then at 314, the kernel extension corresponding to the selected PCM may be loaded. Therefore, the PCM kernel extension (previously determined with respect to step 308) may be loaded and the kernel extension ID may be passed to the device driver configuration entry point while configuring the LUN.

Next at 316, the LUN is configured using the selected PCM module.

It may be appreciated that FIG. 3 provides only an illustration of one implementation and does not imply any limitations with regard to how different embodiments may be implemented. Many modifications to the depicted environments may be made based on design and implementation requirements. For example, the previously described method may be implemented in the following way such that the disk configuration method selects the PCM automatically as follows:

1. A new entry in the configuration database may be added, such as "pcm_feature_map". The "pcm_feature_map" is a unique map that may help in finding whether a particular feature is supported on a given LUN or not. Additionally, for each device type, there may be a list of possible features (e.g. PPRC, T10 DIF etc.). For each feature there may be a corresponding "pcm_feature_map" entry that maps the feature to the preferred PCM to be used if the LUN supports that specific feature. The pcm_feature_map may be a string consisting of:

SCSI command(inquiry/mode-sense/etc)—1 byte
page code—1 byte
offset—1 byte
length (in bytes)—16 bytes
mask—16 bytes
expected value—16 bytes
PCM—64 bytes Typically a LUN may be queried for a supported feature by sending a SCSI command (usually a SCSI INQUIRY command) to a vendor specific page or standard page (page 0x0). If the value at the given "offset" after ANDing with the given "mask" matches with the "expected_value" then the feature is supported by the LUN and the given "PCM" is the preferred PCM to configure the LUN. For example, the pcm_feature_map for PPRC feature may look similar to:

SCSI command(inquiry/mode-sense/etc)—0x12
page code—0xc0
offset—0x04
length (in bytes)—0x01
mask—0x08
expected value—0x01
PCM—"aixdiskpcmke"

2. Following the LUN discovery, the disk configuration method may read each of the "pcm_feature_map" entries and using the keys in the pcm_feature_map the configuration method may determine if the feature is supported by the LUN or not. If the feature is supported, then the corresponding PCM in the "pcm_feature_map" may be used to configure the LUN. If there are multiple features supported by the LUN where each feature recommends a different preferred PCM, then the disk configuration method (i.e., the MPIO PCM Selector Program 108A, 108B (FIG. 1)) may select the PCM for which ever feature is matched first. The user may subsequently change the PCM if the user prefers to change the PCM for the LUN to a different one.

3. If there are no features supported by the LUN described as the "pcm_feature_map" entries in the device configuration database, then the disk configuration method (i.e., the MPIO PCM Selector Program 108A, 108B (FIG. 1) may choose the default PCM for the device type. The default PCM corresponding to a device type is mentioned in the device configuration file or database as shown in entry "d" 202 FIG. 2.

Additionally, the present embodiment proposes a method that may allow each individual LUN to use a PCM that best suits the LUN in addition to storing all the possible supported features of a LUN in a configuration attribute and having maps to preferred PCMs for each feature. Also, the format of the configuration attribute may be such that it may be used to query the LUN device which can be a small computer system interface (SCSI) command, offset, or length. Furthermore, the present embodiment may retrieve the features supported by the LUN during LUN discovery as per an attribute and the automatic selection of the path control module (PCM) for a LUN may be based on the LUN supported features. The present embodiment may automatically tune the PCM configuration attribute for a single LUN based on its supported features in addition to storing the unique ID to PCM map in the persistent configuration database which may be used across machine reboots. Additionally, the PCM may be chosen based on the unique identifier of the LUN, so that the chosen PCM may be preserved across machine reboots. Furthermore, the present embodiment may enable the user to choose a PCM at disk level after configuration.

Figure 4:
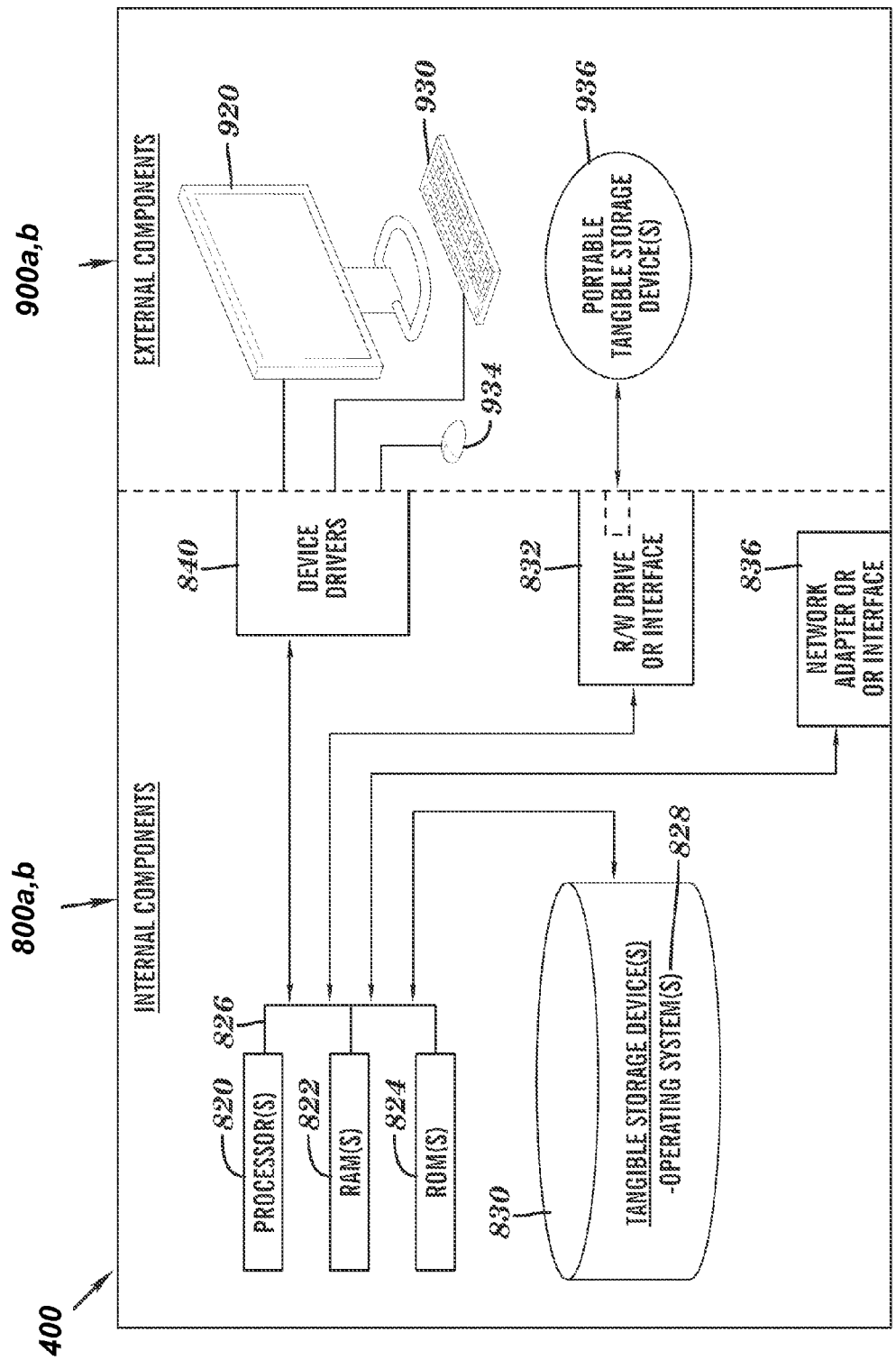
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and MPIO PCM Selector Program 108A (FIG. 1) in client computer 102 (FIG. 1) and MPIO PCM Selector Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device.

A software program, such as MPIO PCM Selector Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The MPIO PCM Selector Program 108A (FIG. 1) in client computer 102 (FIG. 1) and MPIO PCM Selector Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the MPIO PCM Selector Program 108A (FIG. 1) in client computer 102 (FIG. 1) and the MPIO PCM Selector Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selecting a path control module (PCM) for a logical unit number (LUN) associated with a host enabled to support multiple PCMs, the method comprising:
   selecting a PCM associated with the LUN from a plurality of supported PCMs;
   creating an entry in a configuration database or a configuration file associated with the host, wherein the entry maps the selected PCM with a unique ID associated with the LUN;
   determining a unique ID associated with a hard disk;
   matching the unique ID associated with the hard disk with the created entry in the configuration database or the configuration file;
   selecting the PCM from the matched entry in the configuration database or the configuration file based on the matching;
   loading a kernel extension corresponding to the selected PCM; and
   configuring the LUN using the loaded kernel extension corresponding to the selected PCM, wherein configuring the LUN comprises storing a plurality of supported features of the LUN in a PCM configuration attribute whereby a map is created corresponding to a preferred PCM for each supported feature within the plurality of supported features.

2. The method of claim 1, wherein configuring the LUN comprises automatically tuning a PCM configuration attribute for a single LUN.

3. The method of claim 2, wherein tuning the PCM configuration attribute for the single LUN comprises choosing a best PCM based on a plurality of supported feature information associated with the PCM.

4. The method of claim 2, wherein the PCM configuration attribute comprises a format that can be used to query a device associated with the LUN.

5. The method of claim 4, wherein the query comprises at least one of a SCSI command, and offset, and a length.

6. The method of claim 1, wherein the plurality of supported feature information is retrieved from the LUN during a discovery of the LUN.

7. A computer system for selecting a path control module (PCM) for a logical unit number (LUN) associated with a host enabled to support multiple PCMs, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   selecting a PCM associated with the LUN from a plurality of supported PCMs;
   creating an entry in a configuration database or a configuration file associated with the host, wherein the entry maps the selected PCM with a unique ID associated with the LUN;
   determining a unique ID associated with a hard disk;
   matching the unique ID associated with the hard disk with the created entry in the configuration database or the configuration file;
   selecting the PCM from the matched entry in the configuration database or the configuration file based on the matching;
   loading a kernel extension corresponding to the selected PCM; and
   configuring the LUN using the loaded kernel extension corresponding to the selected PCM, wherein configuring the LUN comprises storing a plurality of supported features of the LUN in a PCM configuration attribute whereby a map is created corresponding to a preferred PCM for each supported feature within the plurality of supported features.

8. The computer system of claim 7, wherein configuring the LUN comprises automatically tuning a PCM configuration attribute for a single LUN.

9. The computer system of claim 8, wherein tuning the PCM configuration attribute for the single LUN comprises choosing a best PCM based on a plurality of supported feature information associated with the PCM.

10. The computer system of claim 8, wherein the PCM configuration attribute comprises a format that can be used to query a device associated with the LUN.

11. The computer system of claim 10, wherein the query comprises at least one of a SCSI command, and offset, and a length.

12. The computer system of claim 7, wherein the plurality of supported feature information is retrieved from the LUN during a discovery of the LUN.

13. A computer program product for selecting a path control module (PCM) for a logical unit number (LUN) associated with a host enabled to support multiple PCMs, the computer program product comprising:
one or more computer-readable tangible storage medium and program instructions stored on at least one of the one or more tangible storage medium, the program instructions executable by a processor, the program instructions comprising:
program instructions to select a PCM associated with the LUN from a plurality of supported PCMs;
program instructions to create an entry in a configuration database or a configuration file associated with the host, wherein the entry maps the selected PCM with a unique ID associated with the LUN;
program instructions to determine a unique ID associated with a hard disk;
program instructions to match the unique ID associated with the hard disk with the created entry in the configuration database or the configuration file;
program instructions to select the PCM from the matched entry in the configuration database or the configuration file based on the matching;
program instructions to load a kernel extension corresponding to the selected PCM; and
program instructions to configure the LUN using the loaded kernel extension corresponding to the selected PCM, wherein configuring the LUN comprises storing a plurality of supported features of the LUN in a PCM configuration attribute whereby a map is created corresponding to a preferred PCM for each supported feature within the plurality of supported features.

14. The computer program product of claim 13, wherein configuring the LUN comprises automatically tuning a PCM configuration attribute for a single LUN.

15. The computer program product of claim 14, wherein tuning the PCM configuration attribute for the single LUN comprises choosing a best PCM based on a plurality of supported feature information associated with the PCM.

16. The computer program product of claim 14, wherein the PCM configuration attribute comprises a format that can be used to query a device associated with the LUN.

17. The computer program product of claim 13, wherein the plurality of supported feature information is retrieved from the LUN during a discovery of the LUN.

* * * * *